Figure 2:
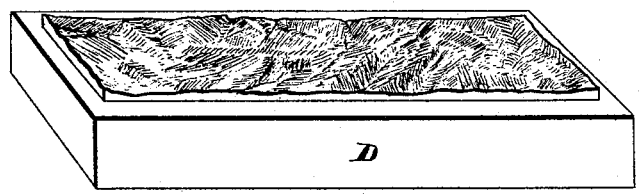

(No Model.)

C. W. STEVENS.
METHOD OF MANUFACTURING ROCK FACED ARTIFICIAL STONE.

No. 457,231. Patented Aug. 4, 1891.

Witnesses
Inventor
C. W. Stevens.
By Hopkins & Atkins
Attorneys

UNITED STATES PATENT OFFICE.

CHARLES W. STEVENS, OF LANSING, MICHIGAN.

METHOD OF MANUFACTURING ROCK-FACED ARTIFICIAL STONE.

SPECIFICATION forming part of Letters Patent No. 457,231, dated August 4, 1891.

Application filed February 14, 1891. Serial No. 381,494. (No model.)

*To all whom it may concern:*

Be it known that I, CHARLES W. STEVENS, of the city of Lansing, county of Ingham, and State of Michigan, have invented a certain new and useful Method of Manufacturing Rock-Faced Artificial Stone, of which the following is a specification, reference being had to the accompanying drawings.

My invention consists in a certain method of forming the face of plastic material from which artificial stone is to be made, so as to perfectly simulate the appearance of rough-hewn blocks of natural stone.

Heretofore in attempts to produce rock-faced stone by artificial means it has been usual to prepare a mold of suitable shape and in that mold to make a brick from suitable plastic material. The article produced by this means, however, has a smooth surface that instantly betrays its artificial character and therefore detracts from its beauty for building purposes. This defect has been sought to be remedied by sprinkling the face of the mold with sand, so as to render the surface of the molded brick rough. This process at best has served only to produce a harsh surface and has not effected the desired result—viz., to produce a surface in the artificial block that closely imitates the broken appearance of natural stone. The reason probably is that the grains of sand impacted into the surface of the brick between the rigid lines of the mold and the plastic material from which the brick is composed becomes partially embedded in the material, and therefore only to a small degree prevents the smooth appearance in the surface which is characteristic of bricks manufactured without the use of sand.

In practicing my invention I prepare a box of any suitable dimensions for forming the outside lines of the brick. Those being in use intended to be covered up may be made in the usual manner. It is in forming the face of the brick in imitation of cut stone that my invention lies. To do this I prepare in the bottom of the box a mass of ground stone or sharp sand, which usually resembles in appearance the disintegrated particles of stone which I propose to imitate. I preferably shape this mass by hand or by any other suitable means into irregular surfaces, and into the mold upon the top of sand so prepared I pour plastic material of any ordinary kind usually employed in the manufacture of artificial stone, such material usually consisting of sand or ground stone, with cement and water or the like to give it the proper consistency and bind the parts together in a homogeneous mass. When the plastic material is poured into the mold, a portion of the cement sinks into the sand, prepared as described, binds it together, and assimilates it with the material poured into the mold. It penetrates an unequal distance into the mass of sand by reason of the unequal density of the mass and its consequent unequal resistance to permeation by the liquid cement, and would produce, therefore, without more, a rough rock-faced stone such as would be produced in natural stone by cleavage, for instance; but in order to give it the roughened and irregularly-shaped surface of hammer-broken stone it is necessary to form inequalities in the surface of the mass of sand in the bottom of the box, as above suggested. The face of the brick so formed when withdrawn from the mold will be irregularly broken and of a perfectly-natural appearance. The sand in the bottom of the box is in no sense a mold. The line of division between the brick after it has set and the sand can never be predetermined. The brick does not assume the form of the pattern made in the mass of the sand in the bottom of the box; but its shape is only to a degree fixed thereby. Consequently the surfaces that may be produced by my method may be infinitely varied, no two surfaces being exactly alike, although the mass of sand in the bottom of the mold may have been made to conform exactly in all respects.

In preparing the plastic material for making a brick according to my method any suitable coloring material may be used in its composition, so as to impart to the manufactured stone any desired color.

Figure 1:
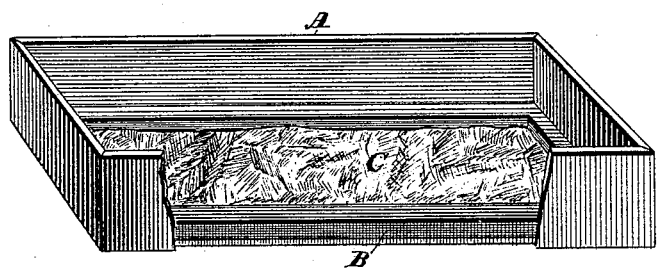

I have illustrated in the drawings, in Figure 1, a suitable box, showing the mass of sand molded or prepared in the bottom thereof, and in Fig. 2 the brick as it comes from the mold.

Referring to the letters on the drawings, A indicates a box, which, if desired, may be provided with ribs B around its lower inside corners to give a flat smooth edge to the brick in imitation of cut stone.

C indicates the mass of sand or ground stone in the bottom of the box, molded into irregular surfaces, as above explained.

D indicates the block of artificial stone withdrawn from the mold.

What I claim is—

The method of producing rock-faced artificial stone, which consists in covering the bottom of a suitable box with a mass of sand or the like and filling the box with plastic artificial-stone material, whereby the mass of sand is partially permeated by the liquid cement of the plastic material and is assimilated with the plastic material to form a natural broken surface for the artificial stone, substantially as set forth.

In testimony of all which I have hereunto subscribed my name.

CHARLES W. STEVENS.

Witnesses:
JAMES A. PARK,
P. E. PARK.